(12) United States Patent
High et al.

(10) Patent No.: US 12,557,189 B2
(45) Date of Patent: Feb. 17, 2026

(54) LED ILLUMINATOR WITH AUTOMATIC STROBE MODE AND ADJUSTABLE STROBE INTENSITY

(71) Applicant: Metaphase Technologies Inc., Bristol, PA (US)

(72) Inventors: Kevin High, Levittown, PA (US); Lukasz Maksymiuk, Blue Bell, PA (US); Qianjun Wu, Croydon, PA (US); Warren Southard, Norristown, PA (US); Philip Hall, Ottsville, PA (US)

(73) Assignee: Metaphase Technologies Inc., Bristol, PA (US)

( * ) Notice: Subject to any disclaimer, the term of this patent is extended or adjusted under 35 U.S.C. 154(b) by 49 days.

(21) Appl. No.: 18/767,911

(22) Filed: Jul. 9, 2024

(65) Prior Publication Data

US 2026/0020119 A1    Jan. 15, 2026

(51) Int. Cl.
*H05B 45/10*     (2020.01)
*H05B 45/325*    (2020.01)
*H05B 47/155*    (2020.01)

(52) U.S. Cl.
CPC ........... *H05B 45/10* (2020.01); *H05B 45/325* (2020.01); *H05B 47/155* (2020.01)

(58) Field of Classification Search
CPC ........ H05B 45/10; H05B 45/20; H05B 45/30; H05B 45/325; H05B 47/10; H05B 47/155
See application file for complete search history.

(56) References Cited

U.S. PATENT DOCUMENTS

| | | |
|---|---|---|
| 7,358,679 B2 | 4/2008 | Lys et al. |
| 7,639,219 B2 | 12/2009 | Gallagher et al. |
| 8,096,674 B2 | 1/2012 | Matthews et al. |
| 8,339,062 B2 | 12/2012 | Cencur |
| 9,006,998 B2 | 4/2015 | Dau et al. |
| 9,089,026 B2 | 7/2015 | Yu et al. |
| 11,328,380 B2 | 5/2022 | Pinter et al. |
| 2006/0092276 A1 | 5/2006 | Ariglio et al. |
| 2009/0315477 A1 | 12/2009 | Kinsella |

(Continued)

FOREIGN PATENT DOCUMENTS

| | | |
|---|---|---|
| CN | 206409920 U | 8/2017 |
| JP | 2009109665 A | 5/2009 |
| WO | WO 2020/073559 A1 | 4/2020 |

*Primary Examiner* — Jimmy T Vu
(74) *Attorney, Agent, or Firm* — LaMorte & Associates P.C.

(57) ABSTRACT

An LED illuminator and its associated method of operation. The LED illuminator has an LED array that contains LEDS of one or more colors. An LED driver is provided for each LED color type. Each LED driver has a dimming input for receiving a dimming command signal and a strobe input for receiving a strobe command signal. Each LED driver selectively dims the LEDs it controls when the dimming command signal is received and strobes the LEDs it controls when the strobe command signal is received. A microcontroller is provided that has a separate dimming signal output for each of the LED drivers. The microcontroller is coupled to each dimming input within the LED drivers. The microcontroller has a single strobe signal output coupled to all of the strobe inputs of all the LED drivers. The microcontroller selectively generates the strobe command signal and each dimming command signal.

19 Claims, 6 Drawing Sheets

(56) References Cited

U.S. PATENT DOCUMENTS

| | | |
|---|---|---|
| 2010/0066266 A1 | 3/2010 | Huang et al. |
| 2010/0301751 A1 | 12/2010 | Chobot et al. |
| 2012/0153856 A1 | 6/2012 | Liu et al. |
| 2014/0035484 A1* | 2/2014 | Carli .................. H05B 45/10 315/297 |
| 2021/0299879 A1 | 9/2021 | Pinter et al. |

* cited by examiner

LED ILLUMINATOR WITH AUTOMATIC STROBE MODE AND ADJUSTABLE STROBE INTENSITY

BACKGROUND OF THE INVENTION

1. Field of the Invention

In general, the present invention relates to LED illuminators that can either provide constant light or can strobe, depending upon an operational mode. More particularly, the present invention relates to the control circuitry of LED illuminators that are used to convert the LED illuminator from a constant light source to a strobing light source.

2. Prior Art Description

Lights that contain light emitting diodes (LEDs) are widely used for general illumination. However, since the wavelengths emitted by LEDs can be confined to narrow bandwidths, LED lights are particularly useful for machine vision systems that image selected frequencies of light. LED light used in machine vision systems are typically referred to as LED illuminators. Machine vision systems are predominantly used to inspect and/or count products produced in a factory. Machine vision systems can also be used to monitor manufacturing equipment or align machinery with parts during production. Machine vision systems typically include LED illuminators and one or more specialized cameras that are focused on the areas saturated with light from the LED illuminators. In this manner, the machine vision systems are not affected by changes in ambient lighting and other light sources within the factory.

In many applications, the LED illuminators of a machine vision system need only produce a constant source of illumination where the LED illuminator is always "on". Such illumination is used in product counting, by way of example. However, in other applications, it is beneficial to have an LED illuminator that can flash or strobe. The strobing can produce a much brighter flash of light for inspecting shaded areas of a part or for flash inspecting parts that are rapidly moving. By matching the speed of a strobe to the speed of a moving part, the moving part can appear to stand still and can be readily imaged for inspection. LED illuminators can also be strobed when triggered by a passing part. In this manner, the LED illuminator can illuminate a part as it passes while remaining inactive when there are no parts to inspect.

In a machine vision system, different LED illuminators are often used to produce constant illumination and to produce strobed illumination. However, it is much more space efficient to have a single LED illuminator that can produce both constant light and strobed light. LED illuminators that can produce both constant light and strobed light are designed to have two different modes of operation. The constant lighting mode is typically called the direct current mode, or DC mode. The mode of operation that produces strobed flashes of light is called the strobe mode.

In the DC mode, the LED illuminator creates light at a constant intensity. In the current marketplace, most LED illuminators are powered by 24 VDC. Many of the LED illuminators offer a dimming option that functions through the LED driver to provide for adjustments in light intensity. The driver circuits for the LEDs have an input that receives a dimming voltage that can be selectively varied between zero volts and ten volts. The input voltage is used as an analog control for the driver, wherein the light output of the LEDs becomes proportional to the dimming voltage applied to the input of the driver. More specifically, providing zero volts disables the light output, while providing the maximum dimming voltage produces the maximum light intensity. Dependency between input voltage and output light intensity is usually close to linear.

In the strobe mode, the LED illuminator produces periodic pulses of light. How this is implemented varies between manufacturers and product models. However, there are a few common methods that are typically used within the industry to accomplish strobing. In a first method, an LED strobe is provided with fixed parameters and an autonomous trigger. When enabled, the strobe lights with fixed pulse duration and a repetition rate that is preprogrammed into the drive circuitry of the strobe. In a second method, an LED strobe is provided that has a fixed pulse duration that is triggered by an external source. In this type of strobe, the user cannot alter pulse duration, but can control when the light strobes via a trigger input signal. This mode of operation will usually limit how fast a trigger can be applied, i.e. the maximum repetition frequency.

The third method of operating an LED strobe is a pulse-follow method and is the most advanced implementation. The pulse-follow method has the broadest applications in industry. In the pulse-follow method, the LED strobe will emit light pulses that exactly follow a series of trigger signals. The pulses of the LED strobe copy the duration and frequency of the trigger signals.

When an LED illuminator is in its DC mode, a constant intensity of light is created that depends upon a constant voltage and current (i.e. power) being provided to the LEDs. When an LED illuminator changes from a constant light source to a strobe light, this is typically achieved by momentarily overpowering the LEDs. In the lighting industry, this is typically referred to as "overdriving" the LEDs. When LEDs are in overdrive, the LEDs are powered to a level that exceeds their recommended operating power levels. The extra power results in extra light from the LEDs. Damage to the LEDs is avoided due to the short duration of the strobe pulses. During each strobe pulse, the LEDs are turned on for only a short time. As a consequence, the thermal stresses experienced by the LEDs are no greater than those that are experienced during the DC mode, where the LEDs are constantly activated. In a pulse-follow mode of operation, overdrive can be activated either manually or by microcontroller firmware, which analyzes input trigger temporal parameters. In the latter case, the microcontroller checks pulse width and repetition rate of the strobe and determines if the wanted overdrive mode of operation can be achieved by the LEDs in use. Strobe pulses cannot be too long, nor can the strobe pulses be too frequent, as this will eventually overstress the LEDs and will cause failure.

Since prior art LED illuminators create strobes by overdriving the LEDs, the pulse width and the duty cycle of the strobe have operational limitations that are intended to prevent damage to the LEDs. Furthermore, since the LEDs are being overpowered to produce the strobe, the intensity of the LEDs as it strobes is fixed. As a consequence, the intensity of the light during the strobe cannot be selectively adjusted to optimize visibility and/or to prevent the strobing light from overexposing the machine vision cameras.

A need therefore exists for an improved LED illuminator that can operate both in a constant light DC mode and in a strobe mode, wherein the from pulse width and the duty cycle of the strobe can be extended and wherein the light intensity during a strobe can be selectively controlled. This need is met by the present invention as described and claimed below.

SUMMARY OF THE INVENTION

The present invention is an LED illuminator and its associated method of operation. The LED illuminator has an LED array that contains LEDS of one or more colors. An LED driver is provided for each LED color type. Each LED driver has a dimming input for receiving a dimming command signal and a strobe input for receiving a strobe command signal. Each LED driver selectively dims the LEDs it controls when the dimming command signal is received and strobes the LEDs it controls when the strobe command signal is received.

A microcontroller is provided that has a separate dimming signal output for each of the LED drivers. The microcontroller is coupled to each dimming input within the LED drivers. The microcontroller also has a single strobe signal output coupled to all of the strobe inputs of all the LED drivers. The microcontroller selectively generates the strobe command signal and each dimming command signal.

Alternatively, the microcontroller can output command signal packets containing signals that share a duty cycle. Each LED driver receives the command signal packets, wherein each LED driver selectively dims or strobes the LED array depending upon the duty cycle with the command signal packets.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention LED illuminator can be embodied in many ways, only two exemplary embodiments are illustrated and described. The exemplary embodiments are being shown for the purposes of explanation and description. The exemplary embodiments are selected in order to set forth two of the best modes contemplated for the invention. The illustrated embodiments, however, are merely exemplary and should not be considered as a limitation when interpreting the scope of the appended claims.

Figure 1:
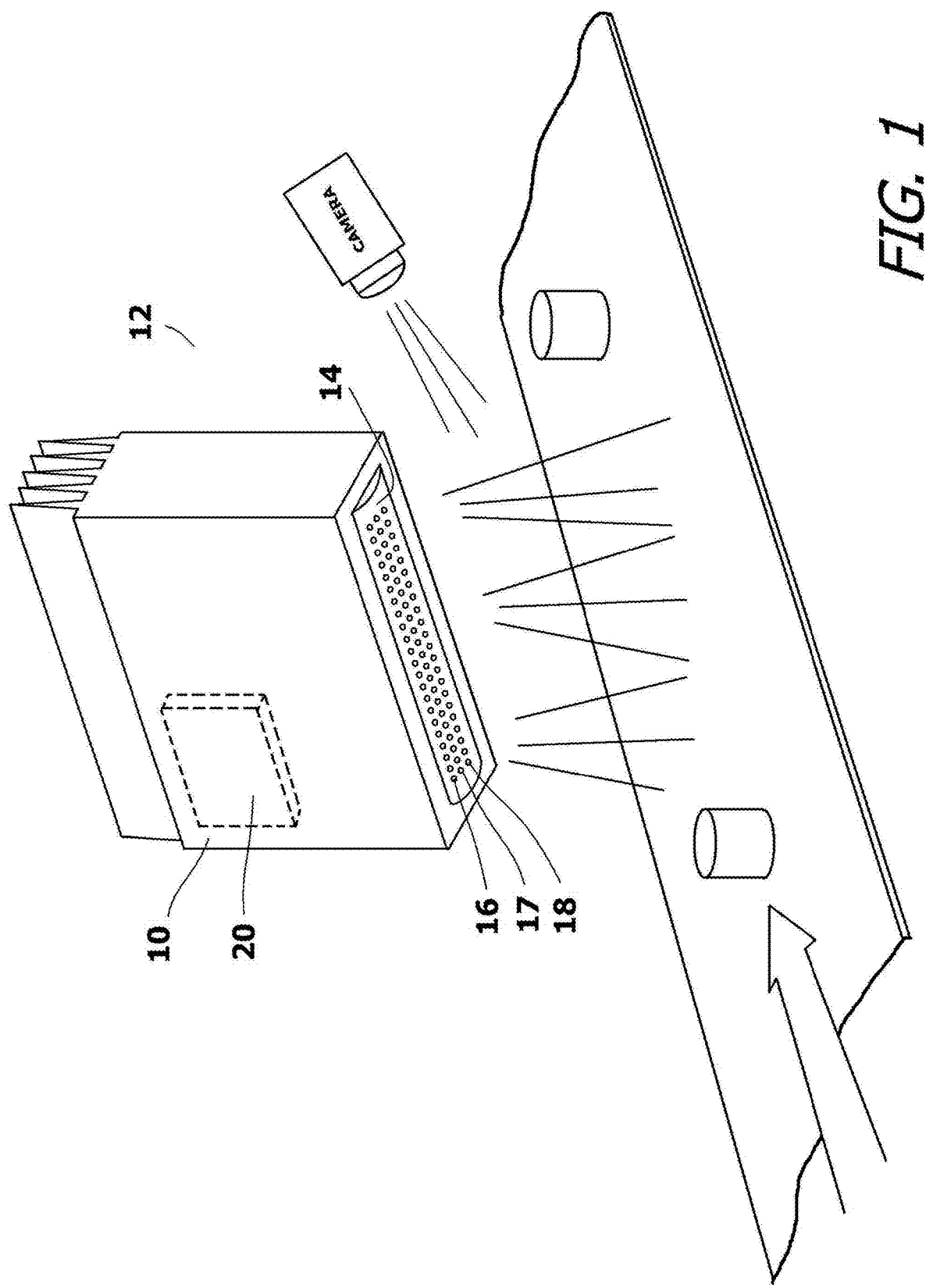
FIG. 1 shows an exemplary embodiment of an LED illuminator integrated into a machine vision system.

Referring to FIG. 1, an LED illuminator 10 is shown that can be used as part of a machine vision system 12. The LED illuminator 10 provides light for inspecting and/or counting parts in an industrial application. For the purposes of discussion and explanation, it can be assumed that the LED illuminator 10 is needed to provide both constant illumination in a DC mode and strobed light in a strobe mode.

The LED illuminator 10 contains an LED array 14. The LED array 14 can contain LEDs of all one color and/or type. However, in the preferred embodiment, the LED array 14 contains LEDs 16, 17, 18 of different colors and/or types. In the illustrations, three LEDs types will be shown. However, it will be understood that only one color or any multitude of colors can be used. The colors and number of colors used in the LED array 14 are determined by the industrial application and the requirements needed to properly inspect a particular product using the machine vision system 12.

Figure 2:
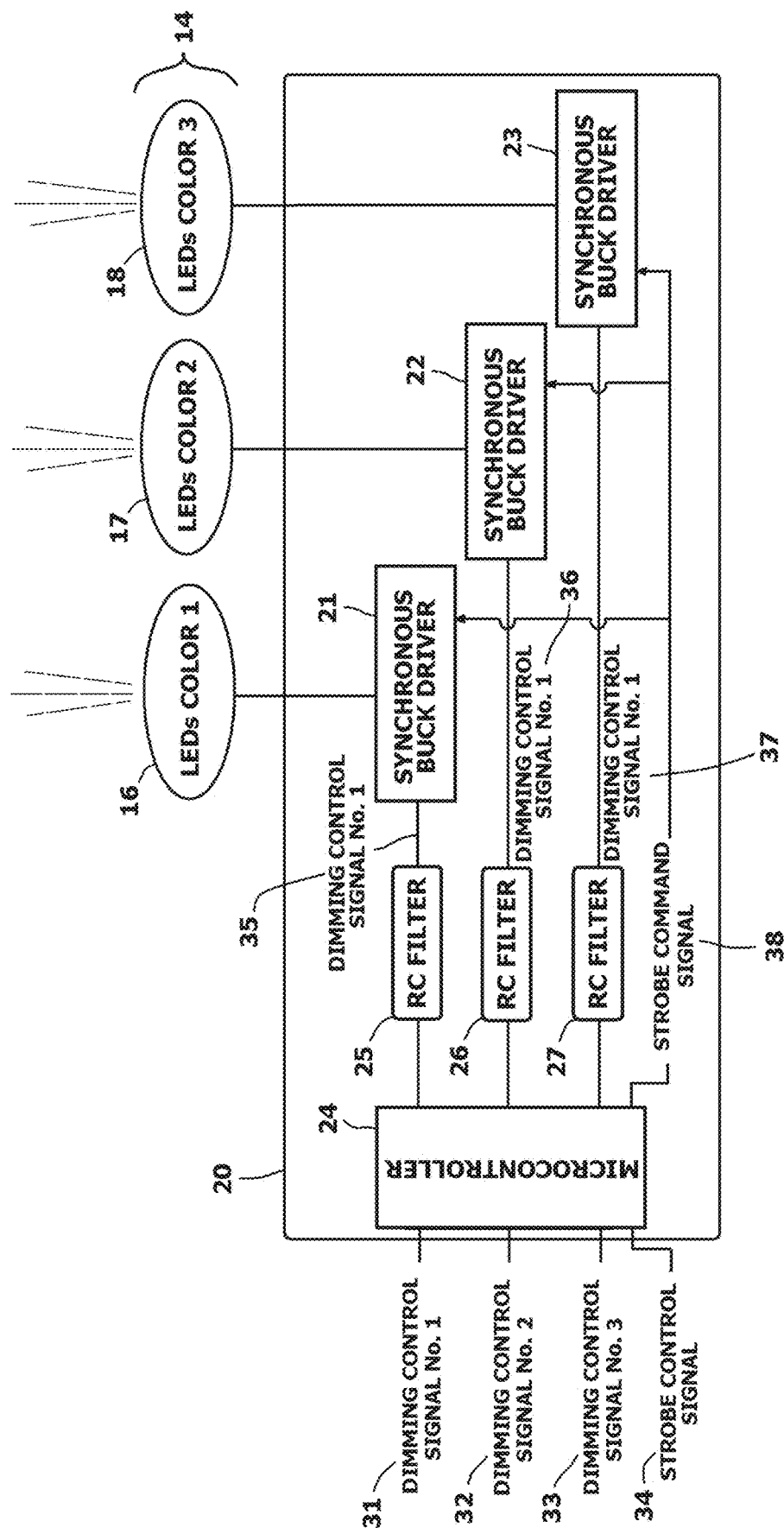
FIG. 2 is a block diagram schematic illustrating the primary components and the method of operation for the LED illuminator.

Referring to FIG. 2 in conjunction with FIG. 1, it can be seen that the LED illuminator 10 also contains an internal control module 20. Synchronous buck drivers 21, 22, 23 are provided within the internal control module 20. There is one synchronous buck driver 21, 22, 23 for each LED color type contained within the LED array 14. Since there are three types of LEDs 16, 17, 18 illustrated, three synchronous buck drivers 21, 22, 23 are also illustrated.

A microcontroller 24 is provided. Each synchronous buck driver 21, 22, 23 is connected to a microcontroller 24 through a corresponding low-pass RC filter 25, 26, 27. The use of the RC filters 25, 26, 27 is optional depending upon the type of microcontroller and/or driver being used. The microcontroller 24 is programable. The microcontroller 24 receives four input signals 31, 32, 33, 34 and produces four output signals 35, 36, 37, 38. All four input signals 31, 32, 33, 34 that are received by the microcontroller 24 are analog input signals that are produced by system users or external sources. The analog input signals 31, 32, 33, 34 are all connected to analog-to-digital converters within the microcontroller 24.

The four input signals 31, 32, 33, 34 include three dimming control signals 31, 32, 33 and a strobe control signal 34. The three dimming control signals 31, 32, 33 are produced when the intensity of light produced by the LED array 14 is to be changed. The dimming control signals 31, 32, 33 are initiated by machine vision operational controls, sensors and/or timers on the production machinery that produces the parts being inspected and/or counted. The signals are pulse width modulation (PWM) signals that are converted into analog voltage by the low pass RC filters 25, 26, 27. Likewise, the strobe command signal 34 is produced when the LED array 14 is needed to strobe. The strobe command signal 34 is produced by machine vision operational controls or some sensors or timers on the production machinery that produces the parts being inspected and/or counted.

The four output signals 35, 36, 37, 38 produced by the microcontroller 24 are all digital signals. The four output signals 35, 36, 37, 38 include three dimming command signals 35, 36, 37 and one strobe command signal 38. The three dimming command signals 35, 36, 37 control the dimming and brightening of the three exemplary LEDs 16, 17, 18, respectively. It will be understood that the number of dimming command signals that can be generated will correspond in number to the different types of LEDs in the LED array 14. Each of the LEDs 16, 17, 18 can be independently controlled. The three dimming command signals 35, 36, 37 are controlled by changes made in the incoming analog dimming control signals 31, 32, 33. The three dimming command signals 35, 36, 37 pass through the three low pass RC filters 25, 26, 27, respectively. The three dimming command signals 35, 36, 37 are then received by the three synchronous buck drivers 21, 22, 23. Each of the three synchronous buck drivers 21, 22, 23 then uses the three dimming command signals 35, 36, 37 to selectively dim or brighten the LEDs 16, 17, 18. It will be understood that some microcontrollers can be used with direct analog outputs that do not require external RC filters to convert PWM signals into analog voltages, therein removing the need for separate RC filters.

The strobe control signal 34 received by the microprocessor 24 is a trigger signal that changes the LED array 14 from a constant illumination DC mode to a strobe mode. The incoming strobe control signal 34 is digitized by the microcontroller 24 into the strobe command signal 38. The single strobe command signal 38 is used as a trigger signal by all three of the synchronous buck drivers 21, 22, 23. The synchronous buck drivers 21, 22, 23 then use the strobe command signal 38 to selectively strobe the LEDs 16, 17, 18. The brightness of the LEDs 16, 17, 19 is controlled exclusively by the three dimming control signals 35, 36, 37. Thus, the LEDs 16, 17, 18 can be strobed at different levels of brightness that can be selectively changed while strobing. The LEDs 16, 17, 18 can therefore be strobed at a brightness level that works best with the machine vision system 12 without oversaturating any cameras or other imaging equipment being utilized.

Figure 3:
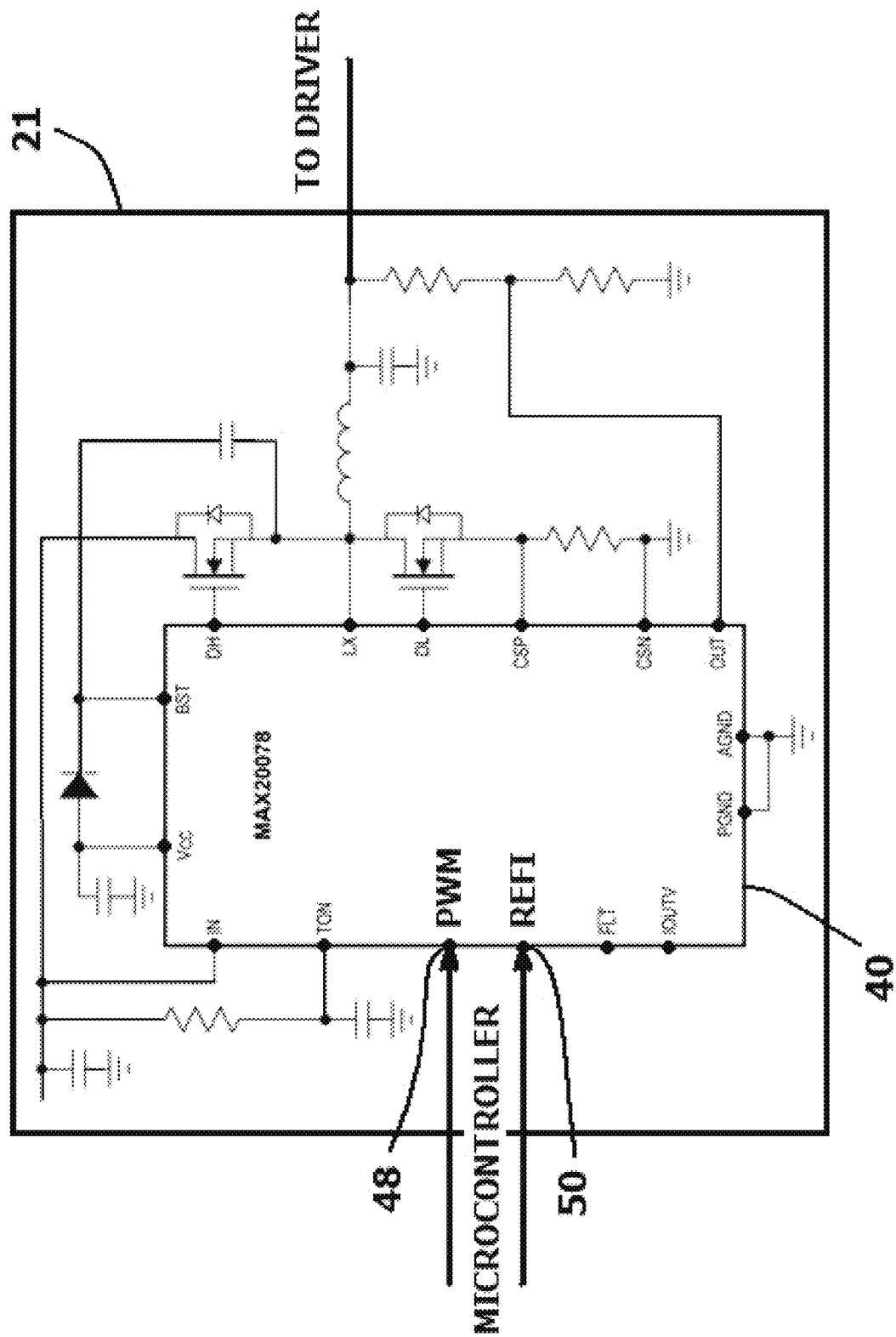
FIG. 3 shows some of the circuitry contained within an LED driver used within the LED illuminator.

Each of the synchronous buck drivers 21, 22, 23 can receive one of the three dimming command signals 35, 36, 37 and the common strobe command signal 38. Referring to FIG. 3 in conjunction with FIG. 2, the first of the synchronous buck drivers 21 is shown by way of example. It will be understood that the second and third synchronous buck drivers 22, 23 are the same as the first synchronous buck drive 21 and only one need be described. In the illustrated embodiment, the synchronous buck driver 21 contains an integrated circuit 40. The integrated circuit 40 has a Pulse Width Modulation (PWM) pin 48, and a reference current (REFI) pin 50. The inputs received by both the PWM pin 48 and the REFI pin 50 are used to control dimming, as is explained below.

When the LED illuminator 10 is in its DC mode of operation and is providing constant illumination, the microcontroller 24 receives the dimming control signals 31, 32, 33. The microcontroller 24 analyzes the dimming control signals 31, 32, 33 to determine the voltage range of the signals. The preferred voltage range is preferably between 0V-10V, where 0V disables the LEDs 16, 17, 18 and 10V produces the maximum illumination in the DC mode. The microcontroller 24 adjusts the outgoing dimming command signals 35, 36, 37 as a function of the detected voltage. The outgoing dimming command signals 35, 36, 37 pass through the low-pass RC filters 25, 26, 27 and are received by the synchronous buck drivers 21, 22, 23. In each synchronous buck drivers 21, 22, 23, the dimming command signals 35, 36, 37 are received at the PWM pins 48. The synchronous buck drivers 21, 23, 24 then dim or brighten the LEDs 16, 17, 18 as a function of the voltages of the incoming dimming control signals 31, 32, 33 received from the microcontroller 24.

The LED illuminator 10 can change from its DC mode to its strobe mode when the strobe control signal 34 is received by the microcontroller 24. When the microcontroller 24 receives the strobe control signal 34, the microcontroller 24 produces the strobe command signal 38. The strobe command signal 38 is forwarded to the PWM pins 48 of the integrated circuit 40 in the synchronous buck drivers 21, 22, 23. The strobe command signal 38 causes the synchronous buck drivers 21, 22, 23 to flash the LEDs 16, 17, 18 in a trigger pulse-follow manner.

There are two types of strobe control signals 34 that can be received by the microcontroller 24. Depending upon the type of the strobe control signal 38 being received, the microcontroller 24 can respond in one of two ways. Normally, the microcontroller 24 controls the synchronous buck drivers 21, 22, 23 to power the LEDs 16, 17, 18 in the LED array 14 at up to twenty-five percent of their maximum operational power. At this operational setting, the LEDs 16, 17, 18 can be dimmed or brightened as they strobe. However, if the strobe control signal 34 has a pulse width of less than 2 ms, and a duty cycle of less than 10%, the microprocessor 24 initiates an overdrive condition. In the overdrive condition, the LEDs 16, 17, 18 are driven to their maximum power. This results in a four-times higher intensity of light, assuming intensity remains proportional to input power. In the overdrive condition, dimming uses the full scale of the inputs at the REFI pins 50 of the integrated circuits 40. This means that the microcontroller 24 generates the dimming command signals 35, 36, 37, that are received by the PWM pins 48 of the integrated circuit 40, from 0% to 100% of the duty cycle. At 100% of the duty cycle, the voltage at the REFI pins 50 of the integrated circuits 40 are at their maximum, therein resulting in the four-times normal overdrive condition.

If the strobe control signal 34 does not have a pulse width of less than 2 ms, and a duty cycle of less than 10%, then the overdrive condition is ended and the LED illuminator 10 returns to its DC mode. The microcontroller 24 then uses only 0%-25% of the duty cycle, which results in REFI pins 50 of the integrated circuits 40 being driven between 0 volts and 25 volts. The intensity of the LED array 14 is therefore reduced to a quarter of the maximum achieved during the overdrive condition.

Figure 4:
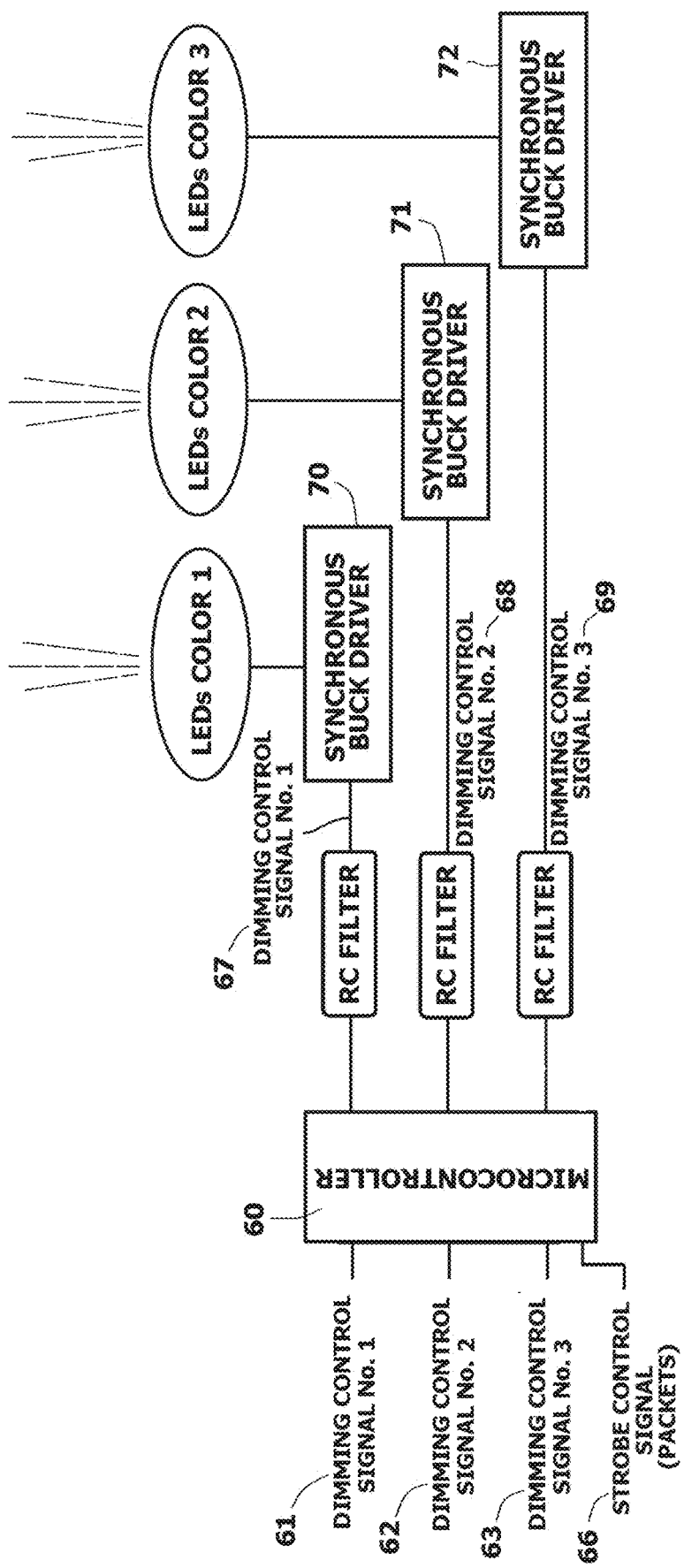
FIG. 4 is a block diagram schematic illustrating the primary components and the method of operation for an alternative embodiment of an LED illuminator.

The method of operation described above requires the synchronous buck drivers 21, 23, 24 receive signals at both the REFI pins 50 and the PWM pins 48 of their internal MOSFET controllers 40. There are other LED drivers in the commercial marketplace that only have a PWM input for receiving dimming control signals. The present invention can be modified for use with such drivers. Referring to FIG. 4, such an alternate embodiment is shown. In FIG. 4, a microcontroller 60 is shown that receives a dimming control signal 61, 62, 63 for each of the LED colors contained in an LED array 64. The microcontroller 60 also receives a strobe control signal 66. The microcontroller 60 generates one command signal 67, 68, 69 for each LED driver 70, 71, 72. The command signal 67, 68, 69 is received by the reference current (REFI) pin within each of the LED drivers 70, 71, 72. The command signal 67, 68, 69 controls both the dimming functions and the strobe functions of the LED array 64.

Figure 5:
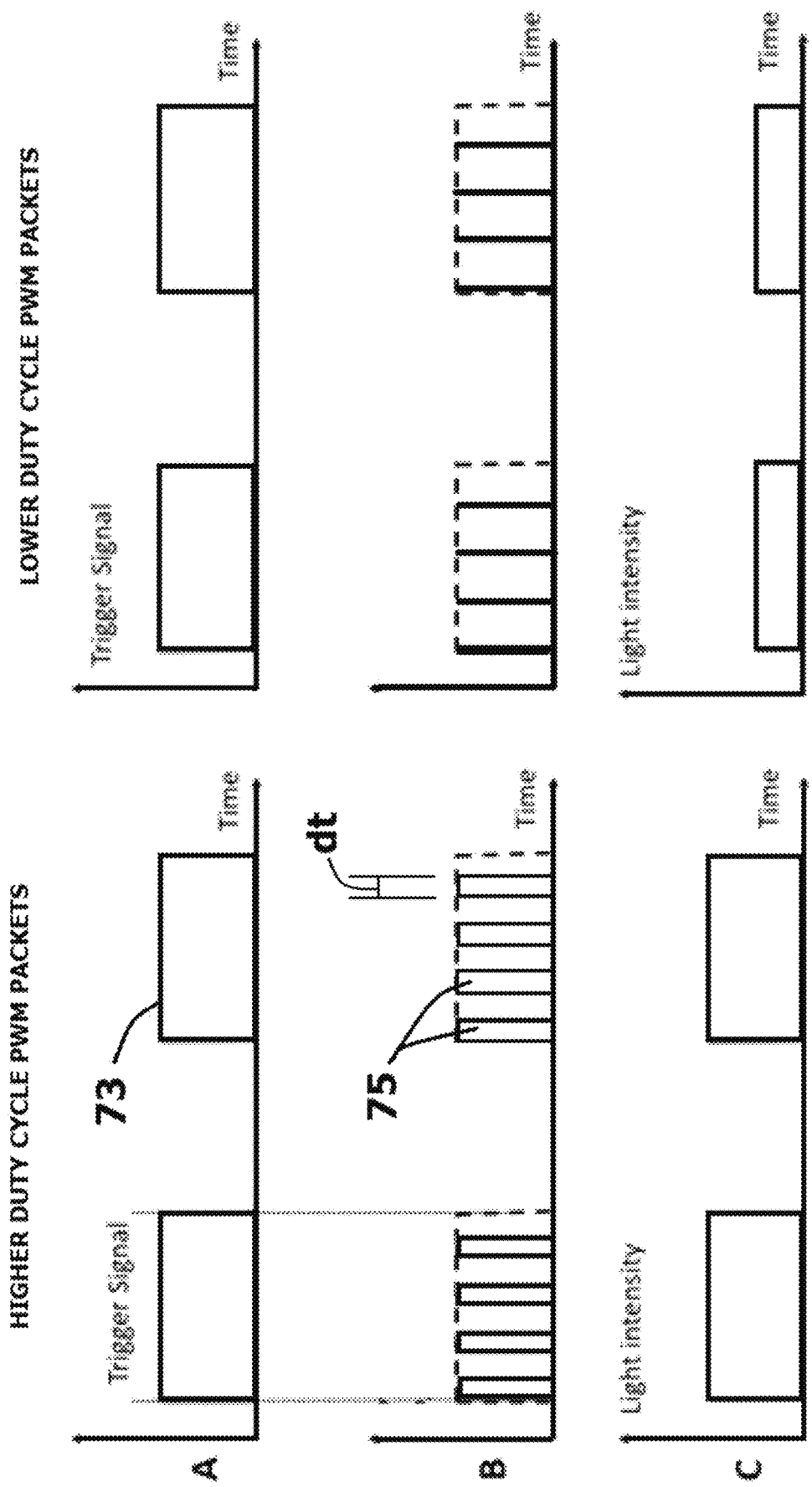
FIG. 5 shows graphs of strobe input signals illustrating how parameters of the signals can be used to control strobing in the alternate embodiment of the LED illuminator shown in FIG. 4.

Referring to FIG. 5 in conjunction with FIG. 4, it can be seen that each command signal 67, 68, 69 is a trigger signal 73 that is utilized by the microcontroller 60 to generate strobed packets 75. Each strobed packet 75 has a packet cycle time (Pt) that can be selectively varied. The duty cycle time (Dt) of each command signal trigger signal 70 can also be selectively varied and used as the dimming control. The value of the strobed packets 75 depends on the mode of operation. In an overdrive condition each command signal 67, 68, 69 ranges between 0% and 100% of the LED's power capacity, where 100% is max light intensity.

Figure 6:
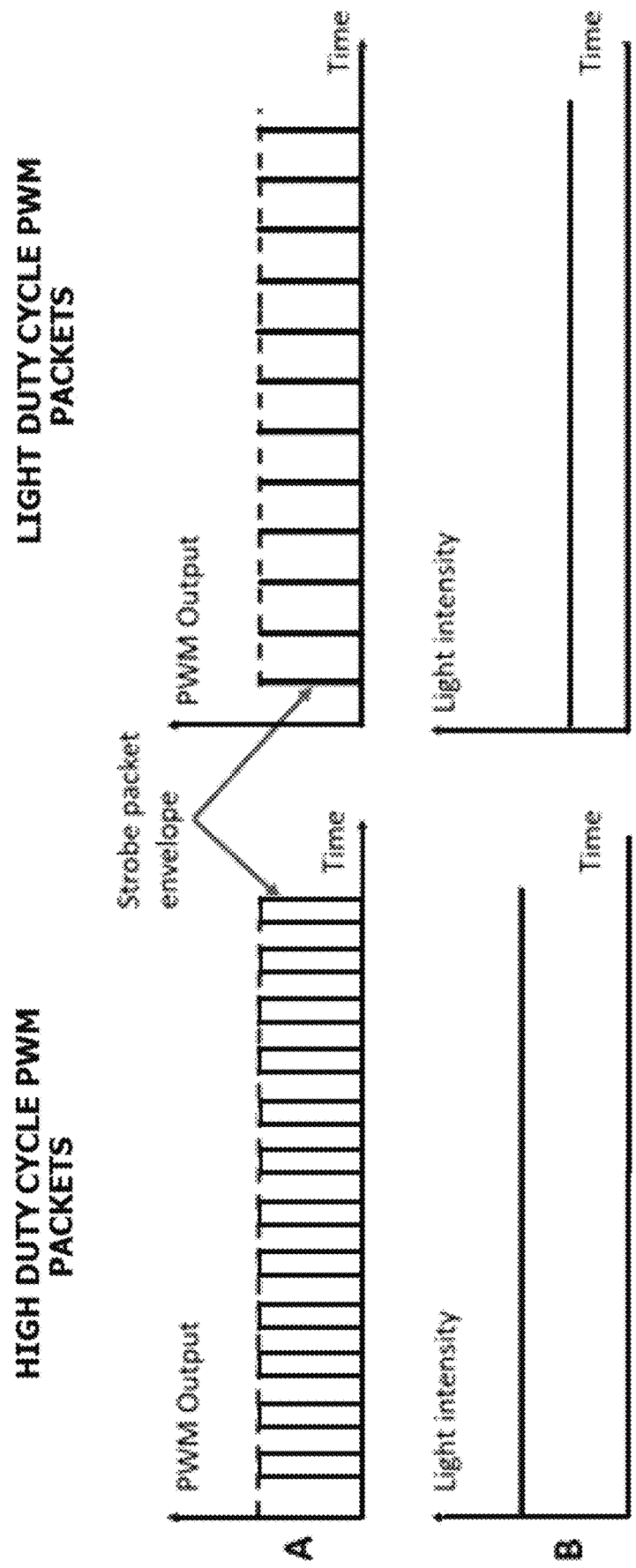
FIG. 6 shows graphs of constant illumination input signals illustrating how parameters of the signals can be used to control strobing in the alternate embodiment of the LED illuminator shown in FIG. 4.

Referring to FIG. 6, it can be seen that in the constant illumination DC mode, each command signal 67, 68, 69 is converted to strobe packets with ranges between 0% and 25% of the LED's maximum power where 25% is the full, undimmed power supplied to the LED array 64 in DC mode. This produces a constant light intensity, where in light can be selectively dimmed by altering the length of the strobe packets.

It will be understood that the embodiments of the present invention that are illustrated and described are merely exemplary and that a person skilled in the art can make many variations to those embodiments. All such embodiments are intended to be included within the scope of the present invention as defined by the appended claims.

What is claimed is:

1. An LED illuminator, comprising;
an array that contains LEDs of more than one color type;
a plurality of drivers including a separate driver for each said color type of said LEDs in said array, wherein each said separate driver has a dimming input for receiving a dimming command signal and a strobe input for receiving a strobe command signal, wherein each said separate driver selectively dims said LEDs controlled by said separate driver when said dimming command signal is received and strobes said LEDs controlled by said separate driver when said strobe command signal is received;
a microcontroller having a separate dimming signal output for each of said plurality of drivers that is coupled to each said dimming input within said plurality of drivers, and wherein said microcontroller has a single strobe signal output coupled to each of said strobe inputs within said plurality of drivers,
wherein said microcontroller selectively generates said strobe command signal and each said dimming command signal.

2. The LED illuminator according to claim 1, wherein each said separate driver from said plurality of drivers can selectively and independently dim said LEDs controlled by said separate driver when said dimming command signal is received by said separate driver.

3. The LED illuminator according to claim 1, wherein said array has a constant lighting mode and a strobe lighting mode, wherein at least some of said LEDs remain on when in said constant lighting mode and all of said LEDs flash when in said strobe lighting mode.

4. The LED illuminator according to claim 3, wherein said LEDs can be selectively dimmed while in said strobe lighting mode.

5. The LED illuminator according to claim 3, wherein said LEDs have a maximum operating power and said LEDs are powered at no more than twenty-five percent of said maximum operating power when in said constant lighting mode.

6. The LED illuminator according to claim 5, wherein said LEDs have an overdrive condition that is achievable while in said strobe lighting mode, wherein said LEDs are powered to said maximum operating power.

7. The LED illuminator according to claim 6, wherein said LEDs are automatically driven to said overdrive condition when said strobe control signal has a pulse width of less than 2 ms, and a duty cycle of less than 10 percent.

8. The LED illuminator according to claim 5, wherein said LEDs are powered at said maximum operating power in said strobe lighting mode should said strobe command signal require a strobe of less than 2 ms and a duty cycle of less than ten percent.

9. The LED illuminator according to claim 1, further including RC filters between said microcontroller and said plurality of drivers through which each said dimming command signal passes.

10. An LED illuminator, comprising;
an LED array that contains LEDs that can operate up to a maximum operating power value;
an LED driver having a dimming input for receiving a dimming command signal and a strobe input for receiving a strobe command signal, wherein said driver selectively dims said LEDs when said dimming command signal is received, and strobes said LEDs controlled by said driver when said strobe command signal is received;
a microcontroller having a dimming signal output coupled to said dimming input within said driver, and wherein said microcontroller has a strobe signal output coupled to said strobe input of said driver,
wherein said microcontroller selectively generates said strobe command signal and said dimming command signal; and
wherein said LED array has a constant lighting mode and a strobe lighting mode, wherein at least some of said LEDs remain on when in said constant lighting mode and all of said LEDs strobe when in said strobe lighting mode.

11. The LED illuminator according to claim 10, wherein said LED array has an overdrive condition that is achievable while in said strobe lighting mode, wherein said LEDs are at said maximum operating power value.

12. The LED illuminator according to claim 11, wherein said LEDs are automatically driven to said overdrive condition when said strobe control signal has a pulse width of less than 2 ms, and a duty cycle of less than 10 percent.

13. The LED illuminator according to claim 10, wherein said LEDs can be selectively dimmed while in said strobe lighting mode.

14. The LED illuminator according to claim 10, wherein said LEDs are powered at no more than twenty-five percent of said maximum operating power value when in said constant lighting mode.

15. The LED illuminator according to claim 10, wherein said driver can selectively dim said LEDs when said dimming command signal is received by said driver.

16. The LED illuminator according to claim 10, wherein said LED array contains LEDs of more than one color type and a separate driver is provided for said LEDs of each said color type in said LED array.

17. An LED illuminator, comprising;
an LED array that contains LEDs that can operate up to a maximum operating power value;
a microcontroller that can receive a dimming control signal and a strobe control signal from an external source, wherein said microcontroller outputs command signal packets containing signals that share a duty cycle;
an LED driver that receives said command signal packets, wherein said driver selectively dims said LED array or strobes said LED array depending upon said duty cycle within said command signal packets.

18. The LED illuminator according to claim 17, wherein said LED array has an overdrive condition that is achievable while being strobed by said driver, wherein said LEDs in said LED array are at said maximum operating power value.

19. The LED illuminator according to claim 18, wherein said LEDs in said LED array are automatically driven to said overdrive condition when said signals in said command signal packets have a pulse width of less than 2 ms, and a duty cycle of less than 10 percent.

* * * * *